United States Patent [19]

Coons et al.

[11] 3,753,515
[45] Aug. 21, 1973

[54] SLIDE TRANSPARENCY SPREADING DEVICE

[75] Inventors: William F. Coons; George T. Negus; Patrick A. Teora, all of Rochester, N.Y.

[73] Assignee: Eastman Kodak Company, Rochester, N.Y.

[22] Filed: Feb. 3, 1972

[21] Appl. No.: 223,158

[52] U.S. Cl.................. 221/191, 221/155, 221/268
[51] Int. Cl.............................................. B65h 3/24
[58] Field of Search.................... 221/191, 155, 268, 221/270, 93; 53/123; 40/36, 78, 63, 106.1

[56] References Cited
UNITED STATES PATENTS
2,937,483  5/1960  Engelstein............................ 53/123
3,373,518  3/1968  Bennett.................................. 40/78
2,938,287  5/1960  Bernabei................................ 40/36

Primary Examiner—Samuel F. Coleman
Assistant Examiner—Joseph J. Rolla
Attorney—William T. French et al.

[57] ABSTRACT

A spreading device for slide transparencies (hereinafter referred to as slides) for spreading or arranging a plurality of such slides in a row in side-by-side relation for loading into a slide clip. The clip is preferably formed of two opposing, substantially U-shaped channel sections connected back-to-back and having flexible legs biased toward one another. The slide spreading device comprises a platform onto which the slides are fed one at a time, preferably emulsion side up, in side-by-side relation, a cover secured to and spaced from the platform to form an enclosed, open ended channel for receiving the slides, and cut-outs in the side edges of the cover to provide access to the side edges of the slides in the channel to facilitate loading them into a slide clip.

10 Claims, 4 Drawing Figures

SLIDE TRANSPARENCY SPREADING DEVICE

BACKGROUND OF THE INVENTION

This invention relates generally to slide handling equipment, and more specifically to a slide spreading device for spreading a plurality of slides in a row in side-by-side relation in position to be previewed and loaded into a slide return clip.

DESCRIPTION OF THE PRIOR ART

It is known in the prior art to process strips of photographic film, to sever the processed filmstrips into individual transparencies, and to mount the transparencies in slide mounts to form slide transparencies or slides. These slides are normally returned to the customer in small cardboard boxes in which the slides are arranged in stacked relation. In order for the customer to view these slides, he must manually remove them individually from the box, and hold them up to a light to view them by transmitted light. Should the customer desire to edit the slides, they are normally individually placed on some suitable illuminating surface where they can all be viewed simultaneously. One disadvantage of such prior known manual packaging and slide handling systems is the increased likelihood of scratching the transparencies or impressing them with fingerprints. In addition, the handling of the slides and inspection thereof by the customer takes considerable time. A further disadvantage of manually stacking and re-stacking the slides in a box by the customer is that the edges of the slides tend to fray, and such handling is conducive to creating a dust condition resulting in dirty slides, particularly when the slide mounts are fabricated from cardboard. The aforementioned disadvantages of handling and inspecting the slides have been greatly overcome by a new slide handling system comprising a slide clip or stick preferably formed from two elongated substantially U-shaped channel sections connected in back-to-back relation by a web, each channel section having legs biased toward one another. A plurality of slides are manually inserted edgewise into each channel section in side-by-side relation and are frictionally held in place by the legs. A slide-handling system of this type is described in U.S. Pat. application, Ser. No. 197,352 filed on Dec. 10, 1971, by Arthur C. Rissberger, Jr. Although such slide handling system greatly minimizes the disadvantages of handling and inspecting slides, manual loading of the slides is still necessary resulting in some danger of scratching or fingerprinting the transparencies. This invention is directed to a slide spreading device which obviates the aforementioned disadvantages, among others, of such manual loading by mechanically spreading the slides in a row in side-by-side relation in position to be loaded into a channel section of a slide clip.

SUMMARY OF THE INVENTION

This invention includes within its scope a slide spreading device for spreading or arranging a plurality of slides in a row in side-by-side relation in position to facilitate previewing and loading the row of slides into a slide holding clip. In a preferred embodiment of the invention, the slide spreading device comprises a base onto which a platform is resiliently mounted for receiving slides fed thereon one at a time in side-by-side relation. Fixed side guides are secured to the base for guiding opposite side edges of the slides. A transparent cover is secured to the fixed guides to form an open ended, enclosed channel for receiving the slides which are urged by the platform against the cover in position to be previewed when spread along the platform. The cover is provided with side cut-outs in register with the side edges of a plurality of the slides to provide access to the side edges. The base is further provided with resiliently mounted side rails in alignment with the fixed side guides and in register with the notches to also provide guides for the side edges of the slides. The side rails are adapted, when manually depressed by one of the legs of a slide clip, the legs uncover the side edges of the slides and align the channel section of the slide clip therewith for loading the slides in the clip. By properly arranging the cut-outs on opposite sides of the channel, the slides of both sides of a loaded clip will be arranged in ascending numerical sequence from right to left.

A customer's order of slides to be fed into the channel and onto the platform is preferably stacked in a hopper at one end of the platform, and the slides are fed into the channel one at a time by any suitable reciprocally operated slide pusher. The slide pusher may be reciprocated manually or by any suitable power means. Although the channel is preferably illustrated in a horizontal orientation, it is within the scope of the invention for the channel to be oriented at some convenient angle to the horizontal, for example vertically oriented, and the slides fed into the channel and spread along the platform under the influence of gravity. In such an embodiment, spring biasing the platform may preferably be dispensed with, and the channel may be provided at the open end thereof with some suitable stop means such as a retractable pin which, when enabled, stops the slides in a proper preselected position in relation to the access means. Although the normal function of the slide spreader is to spread slides in position to be loaded into slide clips, such spreader may also be used to feed slides one at a time through the open end thereof into any suitable receptacle or the like.

Accordingly, it is one of the objects of the present invention to provide a slide spreading device for spreading a plurality of slides in a row in side-by-side relation in position to be loaded into a channel section of a slide clip.

Another object of the invention is to provide a slide spreader for spreading a plurality of slides in a row in side-by-side relation in position to be previewed and then loaded into a slide clip.

Another object of the invention is to provide a slide spreader having oppositely arranged access means to the slides such that the slides when loaded in a slide clip will be oriented in the same direction, and if numbered will be readable on both sides of the clip in an ascending numerical sequence from right to left.

Another object of the invention is to provide a slide spreading device to enable the loading of a channel of a slide clip with a plurality of slides in side-by-side relation without manual handling of the slides.

Another object of the invention is to provide a slide spreading device that is of simple design and construction, thoroughly efficient and reliable in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Figure 4:
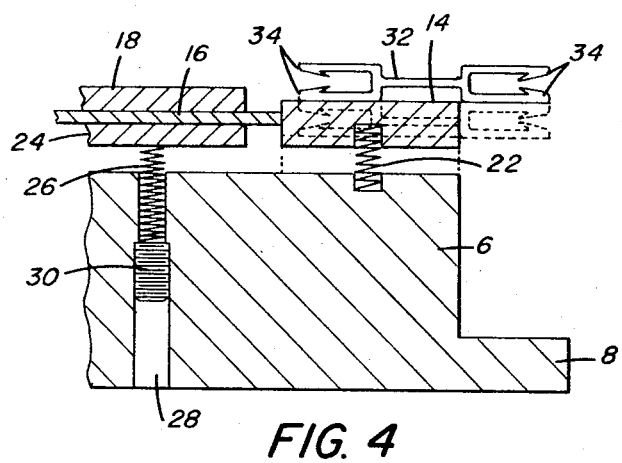
FIG. 4 is a segmental view in section taken substantially along line 4—4 of FIG. 2, and further illustrating the procedure for loading a slide clip.

With reference to the drawings, a preferred embodiment of the slide spreading device of this invention is illustrated comprising a body 6 having side flanges 8 for securing body 6 to a base 10 mountable on any suitable support such as a table, not shown. A plurality of fixed and resiliently mounted guide rails 12, 14 respectively (See FIG. 2) are provided along each edge of body 6 for guiding the side edges of a plurality of slides 16 (shown in phantom in FIG. 2) fed therebetween. A preferably transparent cover 18 of plastic or the like is secured to fixed guide rails 12 and cooperates with body 6 and guide rails 12, 14 to form an open ended, enclosed channel for receiving slides. Cover 18 is provided with side edge cut-outs or notches 20 in register with the resiliently mounted guide rails 14 to provide access to the side edges of slides 16 guided thereby. The guide rails 12 are secured to body 6, and guide rails 14 are resiliently mounted on body 6 (See FIG. 4) by a plurality of helical springs 22, each having one end insertable into an opening in guide rail 14, and the opposite end insertable in a suitable bore in body 6. An elongated platform 24 is resiliently mounted on body 6 between guide rails 12, 14 by a plurality of helical springs, 26 (See FIG. 4) each having one end inserted into an opening in the platform and secured thereto, and its opposite end inserted into an opening 28 in body 6 and bearing against an adjustable screw 30. The screws 30 are adapted to vary the force with which platform 24 is urged upwardly toward cover 18. When a plurality of slides 16 are fed onto platform 24, the side edges thereof are guided by guide rails 12, 14, and the upper faces of the slides are pressed against transparent cover 18 by the resiliently mounted platform 24 in position to be previewed. The guide rails 12, 14 coacting with the force exerted by platform 24 prevents the slides from bouncing out of the cut-outs 20 as the slides are rapidly fed along the platform by any suitable reciprocating mechanism, particularly in slide spreaders where guide rails 14 are omitted. When platform 24 is loaded with slides 16, they are transferred to a slide holding clip 32 comprising a pair of U-shaped channel sections, each formed from legs 34 biased toward one another and joined by a rib (FIG. 4). This loading operation is manually accomplished by the operator engaging guide rail 14 with a leg 34 of slide clip 32 and pressing the guide rail downwardly to align the slide clip channel (shown dotted in FIG. 4) with the side edge of slides 16. The slide clip 32 is manually pressed inwardly against the exposed slide edges (the opposite edges of the slides engaging the fixed guide rail 12) causing the exposed side edges to be frictionally inserted into the channel section of the slide clip. Although only two cover edge cut-outs 20 are shown in the slide spreader, one on each side, it may be provided with any number of such longitudinally spaced cut-outs. In one possible modification, the spreader may be provided with two cut-outs directly opposed from one another, thereby reducing the length of the spreader, and eliminating the need for fixed rails 12.

Figure 2:
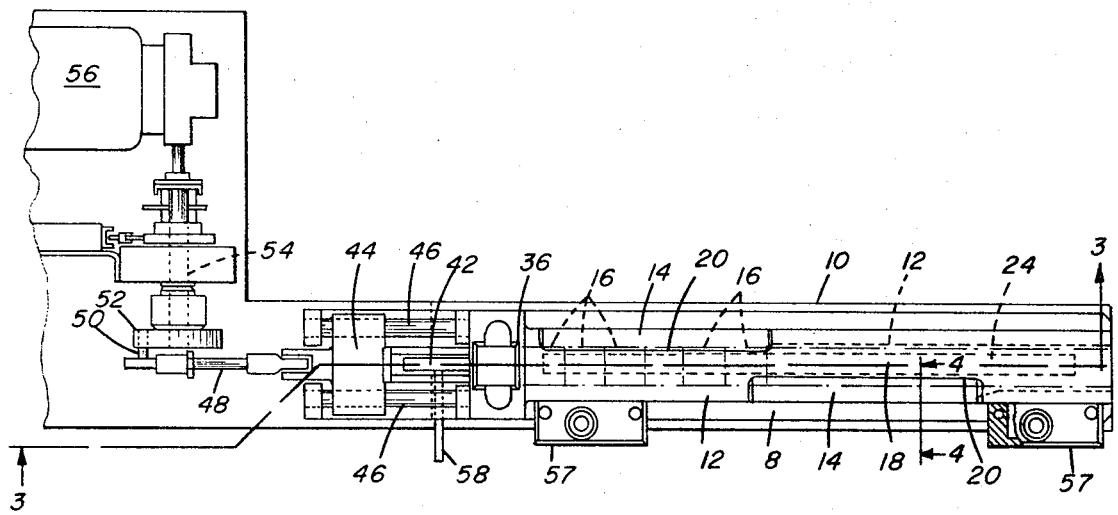
FIG. 2 is an enlarged top plan view of the slide spreader of FIG. 1.

To handle customer rolls of film containing 20 transparencies, the slide spreader is preferably provided with two oppositely disposed cut-outs as illustrated in FIG. 2, each capable of exposing the side edges of five slides. Accordingly, when the slide spreader is full of slides, the operator can load one slide clip 32, loading five slides on one side of the clip and the other five slides on the other side of the clip. By loading the slide spreader twice, and transferring the slides into two slide clips, a single customer's order of 20 slides can be handled. Naturally, the spreader may be constructed with any other desired number of cut-outs 20 of a length capable of exposing a desired number of slides 16.

Figure 1:
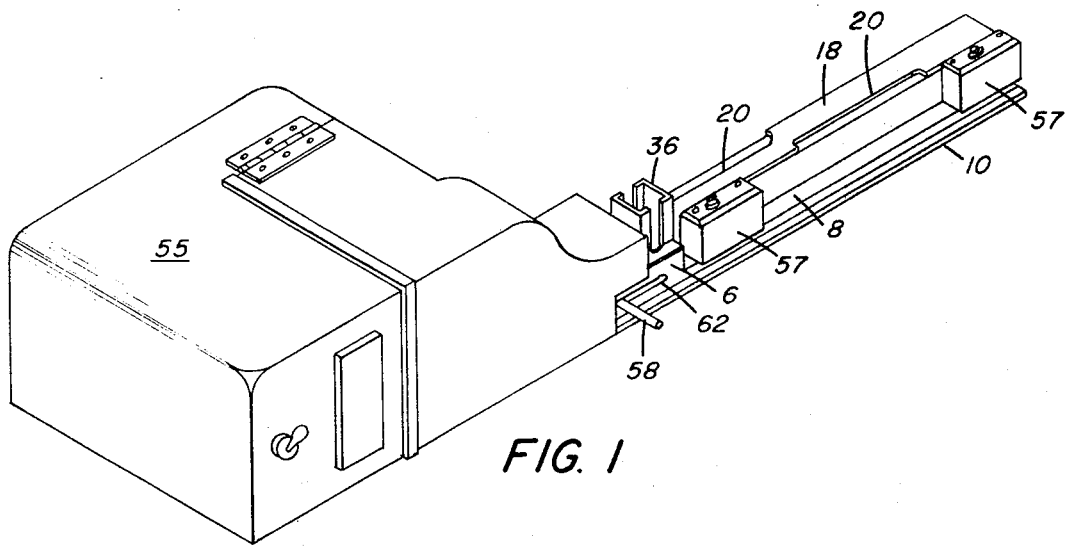
FIG. 1 is a perspective view of a preferred embodiment of the slide spreader of this invention.
Figure 3:
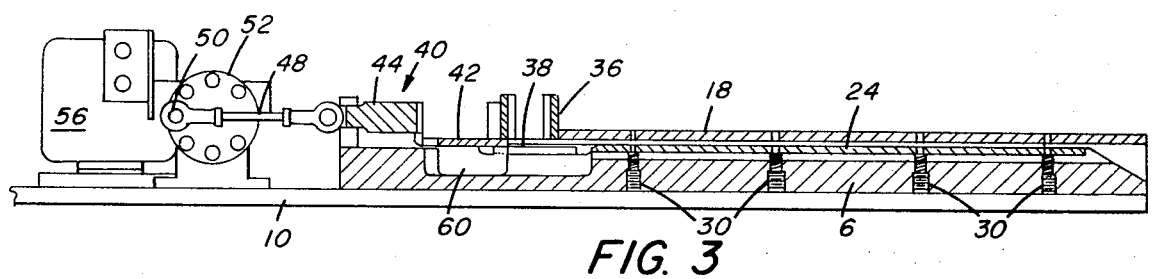
FIG. 3 is a section view taken substantially along line 3—3 of FIG. 2.

The slides 16 may be fed one at a time along platform 24 by any suitable manual or automatic means. In the illustrated embodiment of the invention, a stack of customers' slides are preferably placed in a vertically oriented hopper 36 at one end of platform 24 and onto a support surface 38 substantially level with the upper surface of the platform. The slides 16 are fed one at a time from the bottom of the stack by a slide pusher mechanism 40 of any suitable type comprising an inverted U-shaped pusher blade 42 secured to a reciprocally movable block 44 mounted on a pair of guide rods 46. Movement of the lowermost slide 16 onto support surface 38 is facilitated by a beveled end (FIG. 3) on platform 24. The lowermost slide engages the beveled end and cams the platform downwardly, separating the platform and cover 18 to permit movement of the slides between platform 24 and cover 18. The blade 42 is reciprocally moved by a crank rod 48 having one end pivotally secured to block 44, and the opposite end rotatably mounted on an eccentric crank pin 50 on a wheel 52. The wheel is mounted on a shaft 54 driven by a motor 56 through any suitable gear box, clutch brake, slip clutch or the like enclosed in a housing 55. Accordingly, when the motor is energized, the wheel 52 is driven through one or more rotations, each rotation causing pusher blade 42 to feed one slide onto platform 24. Any suitable motor logic control and counter responsive to operator controlled switches 57 (FIG. 1) may be provided for controlling the number of times the pusher blade is reciprocated to load the slide spreader. When the slides have been transferred from the spreader to a slide clip 32, the motor 56 may again be energized to once again load the spreader. The slide pusher blade 42 may be provided with a manually actuatable handle 58 secured to one of the depending sides 60 thereof and extending through an elongated slot 62 in the base to facilitate manual actuation of the slide pusher mechanism 40.

The platform 24 in the illustrated embodiment is designed to hold the identification slide(s) and one-half (normally 10) of the customer order slides. The identification slide(s) are pushed adjacent the open end of the spreader and remain there while the ten customer order slides are loaded into the clip. Upon the second actuation of the spreader, the remaining ten slides in the hopper are spread onto the platform, filling it up, but not displacing the identification slide(s). After the second group of ten customer order slides are loaded into a second clip, the identification slide(s) remaining in the spreader are used to establish agreement between the two clips containing the customer slides and the remaining portion of the return package containing the customer identification. Upon the first actuation of the spreader for a subsequent customer order, the identification slide(s) for the previous order are pushed through the open end of the spreader by, and are replaced with, the corresponding identification slide(s) of the subsequent order.

The invention has been described in detail with particular reference to a preferred embodiment thereof, but it will be understood that variations and modification can be effected within the spirit and scope of the invention as described hereinabove.

We claim:

1. In a slide spreading device for arranging a plurality of slides in a row in side-by-side relation in position to be loaded into a slide holding clip, the combination comprising:
   receiving means comprising a platform for receiving and supporting a row of slides in side-by-side relation, a cover spaced from said platform and extending over said row of slides, and resilient means for biasing said platform toward said cover for applying pressure to said slides therebetween; and
   access means comprising a cut-out in said cover in register with said one or more of the side edges of said row of slides to provide access thereto.

2. The invention according to claim 1 wherein said receiving means comprises a base for supporting said platform, and a side rail resiliently mounted on said base and arranged adjacent a side of said platform for guiding said one of the side edges of said row of slides.

3. The invention according to claim 1 wherein said receiving means comprises a base, and said platform is resiliently mounted on said base for urging said slides into engagement with said cover.

4. The invention according to claim 1 wherein said receiving means further comprises a base for supporting said platform, and resilient means interposed between said base and said platform for urging said platform toward said cover.

5. The invention according to claim 1 wherein said receiving means further comprises a base for supporting said platform, and said resilient means is interposed between said base and said platform for urging said platform toward said cover, and further including a side rail resiliently mounted on said base adjacent a side of said platform for guiding one of the side edges of said row of slides.

6. In a slide spreading device for arranging a plurality of slides in a row in side-by-side relation in position to be loaded into a slide holding clip, the combination comprising:
   a base having a flat elongated platform for supporting a row of slides in side-by-side, flat orientation;
   said base further having spaced apart guide rails adjacent the sides of said platform for guiding opposite side edges of a row of slides;
   a cover spaced from and supported by said base and cooperating with said base and said rails to form an enclosed, open ended slide receiving chamber;
   means for feeding slides one at a time into said chamber and onto said platform to form a row of slides; and
   said cover further having a cut-out along one edge thereof in register with one of said guide rails and one or more of the side edges of said row of slides to permit access to said side edges.

7. The invention according to claim 6 wherein said platform and said one guide rail are resiliently mounted on said base.

8. The invention according to claim 6 wherein said cover is transparent to permit previewing the slides.

9. The invention according to claim 6 wherein said feeding means comprises a hopper for supporting a stack of slide mounts, and means for successively advancing the bottom-most slide from the hopper onto said platform.

10. The invention according to claim 9 wherein said advancing means comprises a reciprocally movable pusher.

* * * * *